US012639010B2

(12) United States Patent
Schmier et al.

(10) Patent No.: US 12,639,010 B2
(45) Date of Patent: May 26, 2026

(54) DYNAMIC NAND STATUS TIMING ADJUSTMENTS WITH CLOSED LOOP FEEDBACK

(71) Applicant: SanDisk Technologies LLC, Austin, TX (US)

(72) Inventors: Jacob Schmier, Gilbert, AZ (US); Sean Mccutcheon, San Jose, CA (US)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/736,656

(22) Filed: Jun. 7, 2024

(65) Prior Publication Data

US 2025/0377830 A1    Dec. 11, 2025

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | |
|---|---|---|---|
| 10,664,168 B2 | 5/2020 | Canepa | |
| 10,949,115 B2 | 3/2021 | Sun | |
| 11,347,552 B2 | 5/2022 | Krasner | |
| 11,500,543 B2 | 11/2022 | Elliott | |
| 2018/0341403 A1* | 11/2018 | Canepa | .................. G06F 13/16 |
| 2023/0098366 A1* | 3/2023 | Zhu | ........................ G06F 3/0652 |
| | | | 711/154 |

* cited by examiner

*Primary Examiner* — Jared I Rutz
(74) *Attorney, Agent, or Firm* — Arlene Neal; NEAL BLIBO LLC

(57) ABSTRACT

A storage device may dynamically adjust a delay time associated with status polling of a memory device. The storage device includes a memory device to store data and to operate on the data based on commands received from the storage device. A controller on the storage device sends a command to the memory device for the memory device to operate on the data based on the command and sends a poll to the memory device to determine when the memory device has completed processing the command. The controller may record a status poll count for the command in a buffer and compute a running average value for status poll counts in the buffer. The controller compares the running average value with a target window and adjusts a delay time between sending another command and another poll based on based on the comparison.

18 Claims, 6 Drawing Sheets

100

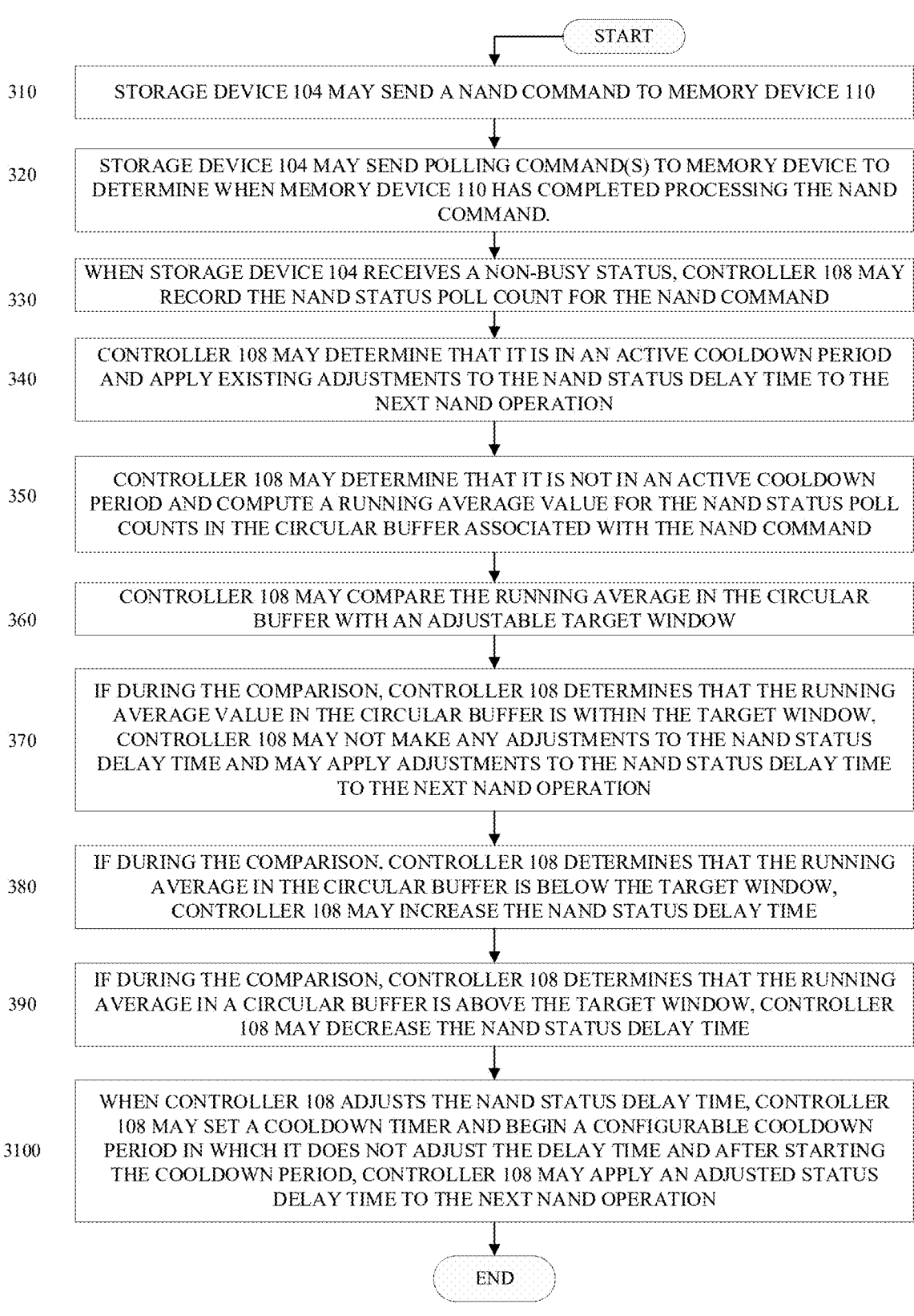

START

310     STORAGE DEVICE 104 MAY SEND A NAND COMMAND TO MEMORY DEVICE 110

320     STORAGE DEVICE 104 MAY SEND POLLING COMMAND(S) TO MEMORY DEVICE TO DETERMINE WHEN MEMORY DEVICE 110 HAS COMPLETED PROCESSING THE NAND COMMAND.

330     WHEN STORAGE DEVICE 104 RECEIVES A NON-BUSY STATUS, CONTROLLER 108 MAY RECORD THE NAND STATUS POLL COUNT FOR THE NAND COMMAND

340     CONTROLLER 108 MAY DETERMINE THAT IT IS IN AN ACTIVE COOLDOWN PERIOD AND APPLY EXISTING ADJUSTMENTS TO THE NAND STATUS DELAY TIME TO THE NEXT NAND OPERATION

350     CONTROLLER 108 MAY DETERMINE THAT IT IS NOT IN AN ACTIVE COOLDOWN PERIOD AND COMPUTE A RUNNING AVERAGE VALUE FOR THE NAND STATUS POLL COUNTS IN THE CIRCULAR BUFFER ASSOCIATED WITH THE NAND COMMAND

360     CONTROLLER 108 MAY COMPARE THE RUNNING AVERAGE IN THE CIRCULAR BUFFER WITH AN ADJUSTABLE TARGET WINDOW

370     IF DURING THE COMPARISON, CONTROLLER 108 DETERMINES THAT THE RUNNING AVERAGE VALUE IN THE CIRCULAR BUFFER IS WITHIN THE TARGET WINDOW, CONTROLLER 108 MAY NOT MAKE ANY ADJUSTMENTS TO THE NAND STATUS DELAY TIME AND MAY APPLY ADJUSTMENTS TO THE NAND STATUS DELAY TIME TO THE NEXT NAND OPERATION

380     IF DURING THE COMPARISON, CONTROLLER 108 DETERMINES THAT THE RUNNING AVERAGE IN THE CIRCULAR BUFFER IS BELOW THE TARGET WINDOW, CONTROLLER 108 MAY INCREASE THE NAND STATUS DELAY TIME

390     IF DURING THE COMPARISON, CONTROLLER 108 DETERMINES THAT THE RUNNING AVERAGE IN A CIRCULAR BUFFER IS ABOVE THE TARGET WINDOW, CONTROLLER 108 MAY DECREASE THE NAND STATUS DELAY TIME

3100     WHEN CONTROLLER 108 ADJUSTS THE NAND STATUS DELAY TIME, CONTROLLER 108 MAY SET A COOLDOWN TIMER AND BEGIN A CONFIGURABLE COOLDOWN PERIOD IN WHICH IT DOES NOT ADJUST THE DELAY TIME AND AFTER STARTING THE COOLDOWN PERIOD, CONTROLLER 108 MAY APPLY AN ADJUSTED STATUS DELAY TIME TO THE NEXT NAND OPERATION

END

DYNAMIC NAND STATUS TIMING ADJUSTMENTS WITH CLOSED LOOP FEEDBACK

BACKGROUND OF THE INVENTION

A storage device may be communicatively coupled to a host and to non-volatile memory including, for example, a NAND flash memory device on which the storage device may store data received from the host. The host may process data stored on the memory device by issuing a command to the storage device which may further process the command and forward the command to the memory device for the memory device to perform a requested task. For example, the host may read, write, or erase data on the memory device by sending a command through the storage device. A controller on the storage device may also execute background operations to manage resources on the memory device. The controller may schedule how commands to program, erase, or read data may be transmitted to the memory device.

When the storage device issues a command to the memory device, the memory device may report a busy status while it is processing the outstanding command. The controller may poll the memory device for a non-busy status to determine when the memory device has completed processing the outstanding command. For example, the controller may repeatedly issue a series of status command polls wherein when the memory device is processing the outstanding command, the memory device may issue a busy status in response to a status command poll and when the memory device has completed processing the outstanding command, the memory device may issue a non-busy status in response to a status command poll. Polling of the memory device via the series of status command polls may add traffic to the bus between the storage device and the memory device.

To reduce the bus traffic, the controller may typically configure a delay before it begins issuing the series of status command polls to account for an expected busy period when the memory device is expected to be processing the outstanding command. The delay times may differ for different commands and conditions. For example, different delay times may be associated with programming or erasing data on the memory device, different delay times may be needed for temperatures or die variations, and different delay times may be associated with read operations wherein the delay times for read operations may depend on page type being read. For example, lower page, middle page, upper, or top page reads may have different busy times in some memory device configurations. The controller may also often configure a delay between successive status command polls to the memory device.

Based on the workload being carried out on the storage device, there may be back pressure on the storage device wherein because of other operations being performed, the controller may delay sending out a status command poll. To account for the back pressure, the controller may begin sending out the status command polls earlier than needed, which may add extra traffic to the bus. The accuracy of the status delay times is important because starting to send status command polls for completion status too early may result in unnecessary traffic on the bus and, depending on the memory device configuration, may compete with the ability of the storage device to issue additional commands to another available die. On the other hand, starting to send the status command polls for completion status too late may reduce the performance of the storage device because a die may no longer be busy and may be available to process other commands, but when there is a delay in detecting the non-busy status, the die may remain idle.

To determine accurate status delay times, a current implementation maintains a table of expected polling times. The expected polling times are typically generated by observing optimal polling times on an observed storage device. The expected polling times may thereafter be applied to all storage devices manufactured after the observation. However, the expected polling times may not account, for example, for temperature variations or variations caused by back pressure on the storage device.

SUMMARY OF THE INVENTION

In some implementations, the storage device may dynamically adjust a delay time associated with status polling of a memory device. The storage device includes a memory device to store data and to operate on the data based on commands received from the storage device. A controller on the storage device may send a command to the memory device for the memory device to operate on the data based on the command. The controller may also send a poll to the memory device to determine when the memory device has completed processing the command. The controller may adjust a delay time between an upcoming command and another poll based on an adjustment mechanism associated with a status poll count.

In some implementations, a method is provided on a storage device for dynamically adjusting a delay time associated with status polling of a memory device by a storage device. The method includes sending a command to the memory device for the memory device to operate on data based on the command and sending a poll to the memory device to determine when the memory device has completed processing the command. The method also includes adjusting a delay time between an upcoming command and another poll based on an adjustment mechanism associated with a status poll count.

In some implementations, the controller may send a command to the memory device for the memory device to operate on the data based on the command and may send a poll to the memory device to determine when the memory device has completed processing the command. The controller may record a status poll count for the command in a buffer and compute a running average value for status poll counts in the buffer. The controller may compare the running average value with a target window and adjust a delay time between sending another command and another poll based on based on the comparison.

BRIEF DESCRIPTION OF THE DRAWINGS

FIG. 3 is an example flow diagram for calculating the NAND status delay time in accordance with some implementations.

Figure 1:
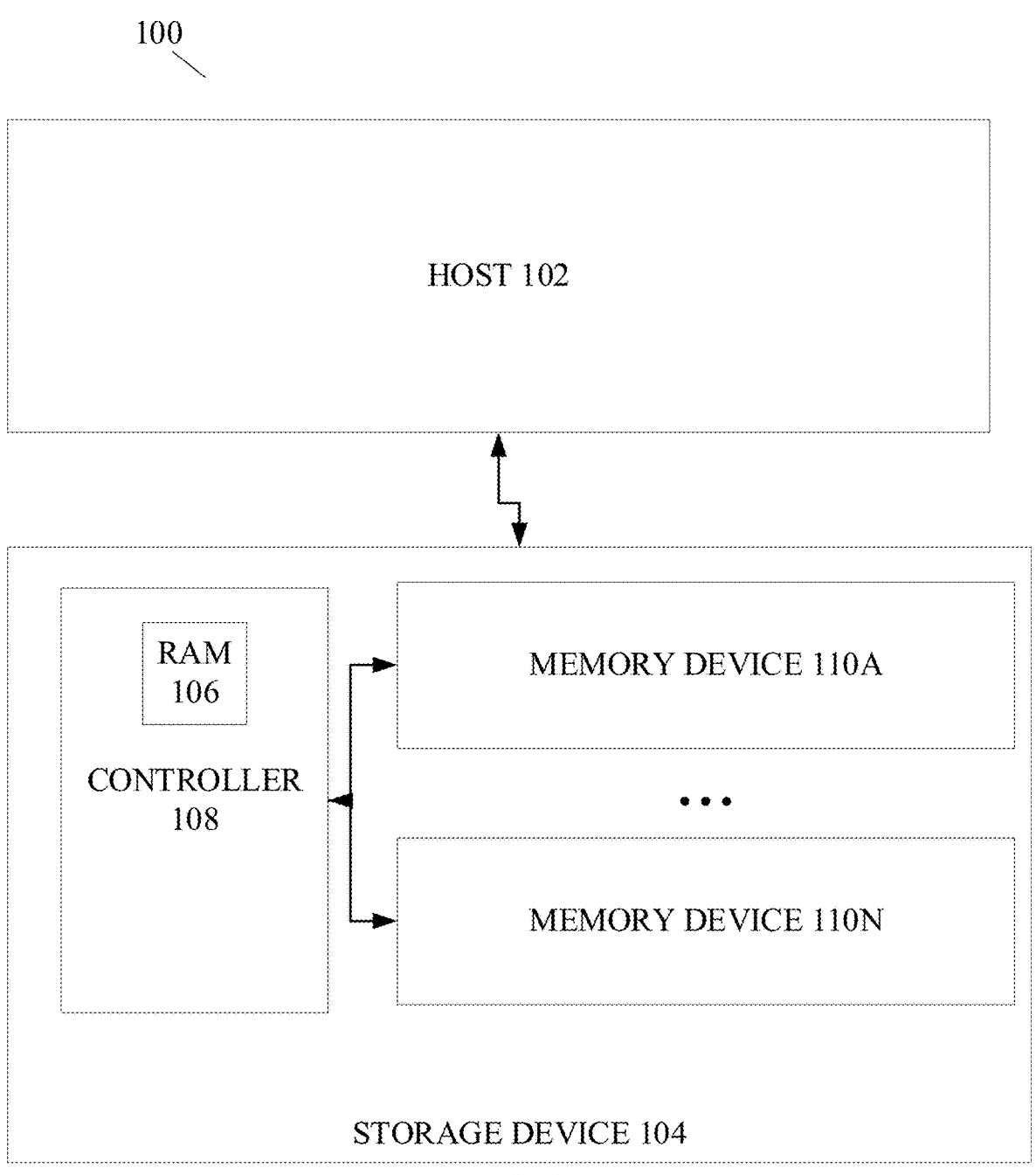
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104 that may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106, a controller 108, and one or more non-volatile memory devices 110*a*-110*n* (referred to herein as the memory device(s) 110). Storage device 104 may be, for example, a solid-state drive (SSD). RAM 106 may be used to store information to be used by controller 108. Controller 108 may interface with host 102 and process foreground operations including instructions transmitted from host 102. For example, controller 108 may read data from and/or write to memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based. For example, memory device 110 may be a NAND flash memory that may be used for storing host and control data over the operational life of memory device 110. Memory device 110 may include multiple dies for storing the data. Data may be stored in blocks on the dies in various formats, with the formats being defined by the number of bits that may be stored per memory cell. Memory device 110 may be included in storage device 104 or may be otherwise communicatively coupled to storage device 104.

As noted, when storage device 104 issues a command including, for example, a read, program, or erase command (referred to generally as a NAND command), to memory device 110, to determine when memory device 110 has completed processing an outstanding NAND command, controller 108 may send status command polls to memory device 110 to poll memory device 110 for a non-busy status.

To avoid unnecessarily adding polling commands on the bus between storage device 104 and memory device 110, controller 108 may calculate a NAND status delay time, i.e., a period between when an upcoming NAND command is sent to memory device 110 and when a first polling command may be sent to memory device 110.

Controller 108 on a new storage device 104 may be configured to use an initial NAND status delay time associated with a command. The initial NAND status delay may be derived from the expected polling times on an observed storage device and may aligned with a corresponding published command time from an appropriate NAND datasheet. When a NAND command being polled for its status is complete (i.e., when controller 108 receives a non-busy status in response to a polling command associated with the NAND command), controller 108 may record the number of polling commands that were issued prior to receiving non-busy status from memory device 110.

In an implementation, instead of applying a fixed static delay time between a NAND command and the first polling command, storage device 104 may employ a closed-loop, dynamic adjustment mechanism to keep a NAND status poll count (i.e., the number of polling commands that were issued prior to receiving non-busy status from memory device 110) as close to a target value as possible. As such, when controller 108 issues a NAND command and later receives a non-busy status from memory device 110 in response to a poll associated with the NAND command, controller 108 may record the NAND status poll count (also referred to as a status poll count) associated with the NAND command. For example, when controller 108 issues a read command, a write command, or an erase command, controller 108 may store the number of polling commands that were issued prior to receiving non-busy status from memory device 110 (i.e., the NAND status poll count for each NAND command). Controller 108 may store the NAND status poll count for each NAND command type in a circular buffer associated with that NAND command type and/or in circular buffers assigned per NAND die and/or page type. For example, controller 108 may store the NAND status poll counts for read commands in a read circular buffer, the NAND status poll counts for program commands in a write circular buffer, and the NAND status poll counts for erase commands in an erase circular buffer.

Controller 108 may compute a running average value for the NAND status poll counts in a circular buffer. For example, controller 108 may compute a running average value for the NAND status poll counts in the read circular buffer or controller 108 may compute a running average value for the NAND status poll counts in the write circular buffer. In an implementation, to quickly compute the running average using integers, a scaling factor may be applied to the NAND status poll counts as they are being stored in the circular buffer.

Storage device may include an adjustable target window that identifies an acceptable range for the running average value for the NAND status poll counts in a circular buffer. In some cases, the adjustable target window may be centered just below a target count of two or a scaled value associated with that target count because when a non-busy status for a NAND command is returned in response to one polling command, that may indicate that the bus may have been idle after the NAND command was completed and some storage device performance may have been sacrificed. If a non-busy status is returned in response to more than two polling commands, that may lead to inefficient use of the NAND bus.

Controller 108 may compare the computed running average in a circular buffer with the adjustable target window. If during the comparison, controller 108 determines that the running average value in a circular buffer is within the target window, controller 108 may not make any adjustments to the NAND status delay time. If during the comparison, controller 108 determines that the running average in a circular buffer is below the target window, controller 108 may increase the NAND status delay time. If during the comparison, controller 108 determines that the running average in a circular buffer is above the target window, controller 108 may decrease the NAND status delay time.

When controller 108 adjusts the NAND status delay time, controller 108 may set a cooldown timer and begin a configurable cooldown period. During the cooldown period, controller 108 may not perform any further computations of the running average or adjust NAND status delay time. This will enable controller 108 to complete outstanding NAND commands prior to adjusting the NAND status delay time and allow the current NAND status delay timing adjustment to take effect before additional changes are considered, thus limiting the frequency of adjustments when the running average drifts outside this target window.

Consider an example where storage device 104 sends a read command to memory device and determines that a NAND status poll count of three is associated with the read command. In employing the adjustment mechanism, controller 108 may store the NAND status poll count (i.e., three or a scaled version thereof, for example, thirty) in a read circular buffer. Controller 108 may compute a running average of the NAND status poll counts in the read circular buffer. If, for example, the running average is thirty and the adjustable target window, centered just below a scaled target count of two, is set between fifteen and twenty-five, controller 108 may determine that the running average is outside of the target window and may decrease the NAND status delay time. Controller 108 may enter a cooldown period and may not perform any further computations of the running average or adjust NAND status delay time during the cooldown period.

In another example where storage device 104 sends another read command to memory device and determines that a NAND status poll count of two is associated with the read command. In employing the adjustment mechanism, controller 108 may store the NAND status poll count (i.e., two or a scaled version thereof, for example, twenty) in the read circular buffer. Controller 108 may compute a running average of the NAND status poll counts in the read circular buffer. If, for example, the running average is ten and the adjustable target window, centered just below a scaled target count of two, is set between fifteen and twenty-five, controller 108 may determine that the running average is outside of the target window and may increase the NAND status delay time. Controller 108 may enter a cooldown period and may not perform any further computations of the running average or adjust NAND status delay time during the cooldown period.

In another example where storage device 104 sends another read command to memory device and determines that a NAND status poll count of two is associated with the read command. In employing the adjustment mechanism, controller 108 may store the NAND status poll count (i.e., two or a scaled version thereof, for example, twenty) in the read circular buffer. Controller 108 may compute a running average of the NAND status poll counts in the read circular buffer. If, for example, the running average is twenty and the adjustable target window, centered just below a scaled target count of two, is set between fifteen and twenty-five, controller 108 may determine that the running average is within of the target window and may not adjust the NAND status delay time.

In an implementation, in employing the adjustment mechanism, a proportional-integral-derivative (PID) controller which is a control loop feedback mechanism that may be used to regulate process variables may be used to regulate the NAND status delay time. The number of NAND status polling commands for a particular NAND command type may be used to calculate an input status delay time. The sum may be used as input into the PID controller. The resulting output from the PID controller may then be used to set a new NAND status delay time.

The closed loop feedback adjustment mechanism for dynamically adjusting NAND status delay timing enables improved NAND bus efficiency by accurately detecting when a NAND operation completes. This approach also detects when the NAND die is available in conditions where a static delay timing is suboptimal due to changes in NAND busy times or delays incurred in starting the NAND status polling. This improved efficiency enables improved SSD performance through better bus utilization by allowing other NAND commands to be issued in quick succession.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
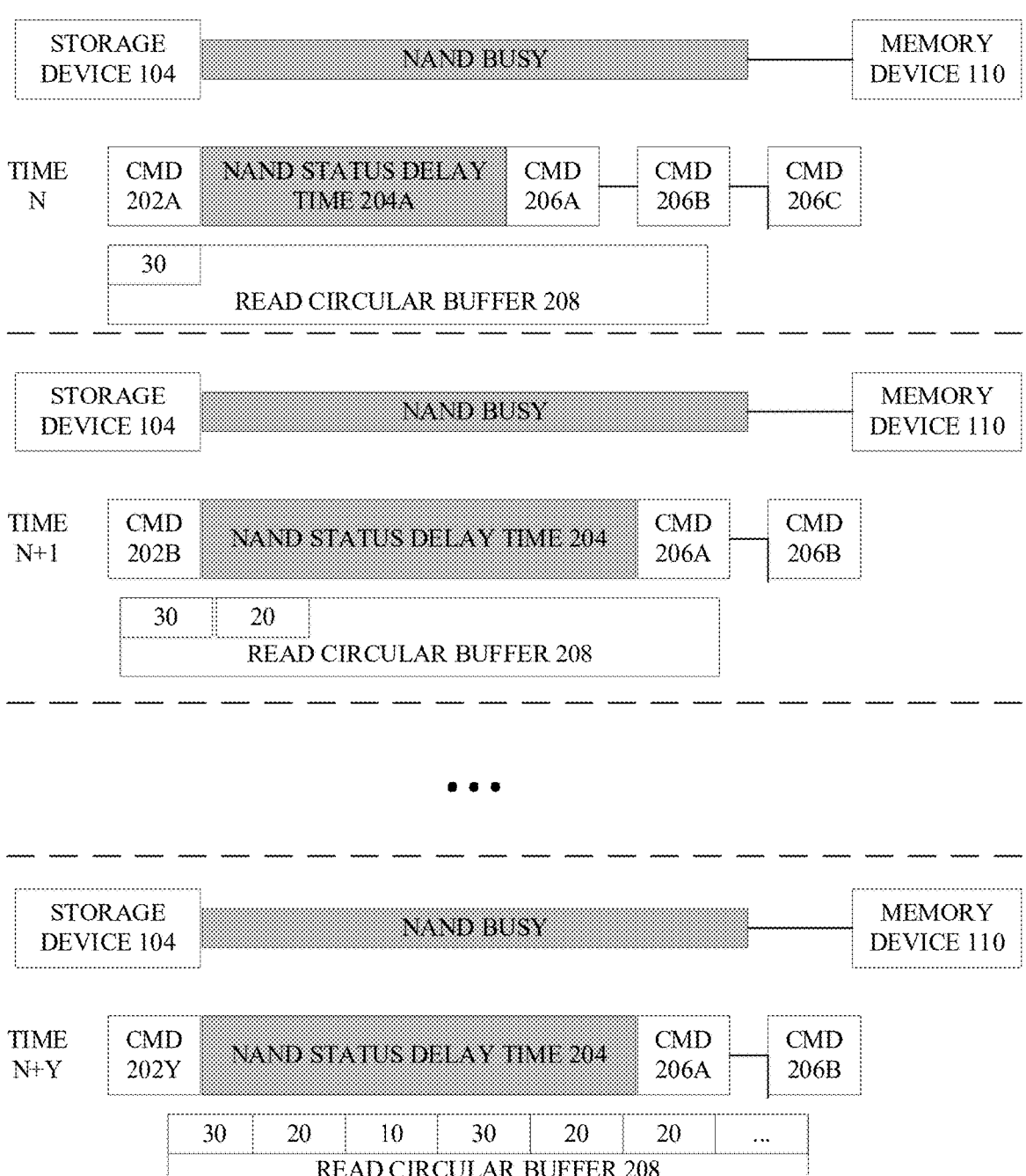
FIG. 2 is an example block diagram showing how a circular buffer is populated to calculate the NAND status delay time in accordance with some implementations.

FIG. 2 is an example block diagram showing how a circular buffer is populated to calculate the NAND status delay time in accordance with some implementations. A new storage device 104 may send a NAND command (CMD) 202A (for example, a read command) to memory device 110 and may use an initial NAND status delay time 204A before sending polling commands 206A-206C (generally referred to herein a polling commands 206 or CMD 206) to memory device 110 to determine when processing of NAND command 202A has been completed by memory device 110. At time N as shown in FIG. 2, storage device 104 may send three polling commands, i.e., CMD 206A-206C to memory device 110, wherein CMD 206A and 206B may be sent while memory device 110 is still processing NAND command 202A, as shown by the NAND busy status between storage device 104 and memory device 110. Storage device 104 may send CMD 206C after memory device 110 has completed processing NAND command 202A and may receive a non-busy signal in response to polling command 206C. Controller 108 may be configured to record the NAND status poll count, i.e., number of polling commands that were issued prior to receiving non-busy status from memory device 110. As such, controller 108 may record the NAND status poll count (i.e., three or a scaled count of thirty) for NAND command 202A in a read circular buffer 208.

At time N+1, storage device 104 may send another NAND command 202B (for example, a second read command) to memory device 110 wherein CMD 206A may be sent while memory device 110 is still processing NAND command 202b, as shown by the NAND BUSY STATUS TIME 204 between storage device 104 and memory device 110. Storage device 104 may record the NAND status poll count (i.e., two or a scaled count of twenty) for NAND command 202B in read circular buffer 208. Storage device 104 may continue sending NAND commands 202 to memory device 110 and continue recording the NAND status poll count for each NAND command in read circular buffer 208, as shown, for example, at time N+Y. At time N+Y, storage device 104 may send another NAND command 202Y (for example, another read command) to memory device 110 wherein CMD 206A may be sent while memory device 110 is still processing NAND command 202b, as shown by the NAND BUSY STATUS TIME 204 between storage device 104 and memory device 110. Storage device 104 may record the NAND status poll count (i.e., two or a scaled count of twenty) for NAND command 202Y in read circular buffer 208. As indicated above FIG. 2 is provided as an example. Other examples may differ from what is described in FIG. 2.

FIG. 3 is an example flow diagram for calculating the NAND status delay time in accordance with some implementations. At 310, storage device 104 may send a NAND command to memory device 110. At 320, storage device 104 may send polling command(s) to memory device to determine when memory device 110 has completed processing the NAND command. At 330, when storage device 104 receives a non-busy status, controller 108 may record the NAND status poll count for the NAND command. At 340, controller 108 may determine that it is in an active cooldown period and apply existing adjustments to the NAND status delay time to the next NAND operation. At 350, controller 108 may determine that it is not in an active cooldown period and compute a running average value for the NAND status poll counts in the circular buffer associated with the NAND command. At 360, controller 108 may compare the running average in the circular buffer with an adjustable target window. At 370, if during the comparison, controller 108 determines that the running average value in the circular buffer is within the target window, controller 108 may not make any adjustments to the NAND status delay time and may apply adjustments to the NAND status delay time to the next NAND operation. At 380, if during the comparison, controller 108 determines that the running average in the circular buffer is below the target window, controller 108 may increase the NAND status delay time. At 390, if during the comparison, controller 108 determines that the running average in a circular buffer is above the target window, controller 108 may decrease the NAND status delay time. At 3100, when controller 108 adjusts the NAND status delay time, controller 108 may set a cooldown timer and begin a configurable cooldown period in which it does not adjust the delay time and after starting the cooldown period, controller 108 may apply an adjusted status delay time to the next NAND operation. As indicated above FIG. 3 is provided as an example. Other examples may differ from what is described in FIG. 3.

Figure 4:
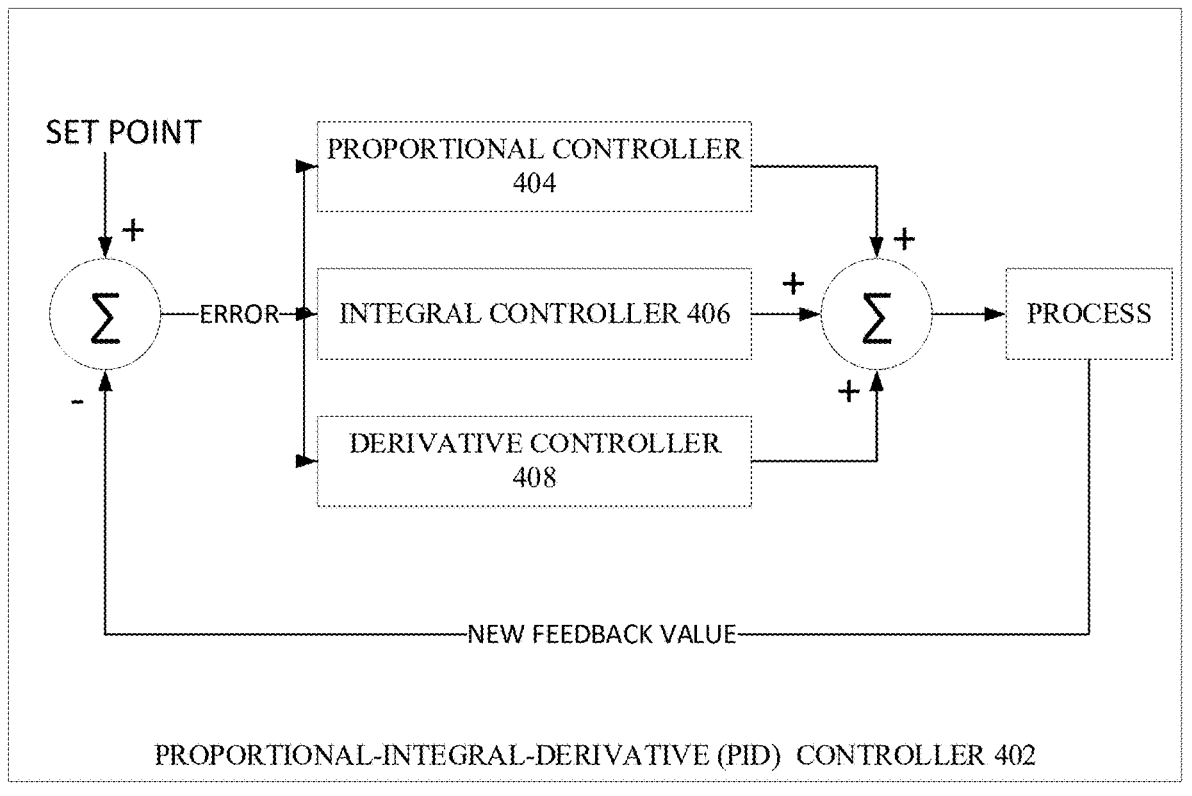
FIG. 4 is an example block diagram of a PID controller used to regulate process variables that may be used to regulate the NAND status delay in accordance with some implementations.

FIG. 4 is an example block diagram of a PID controller used to regulate process variables that may be used to regulate the NAND status delay in accordance with some implementations. The number of NAND status polling commands for a particular NAND command type may be used to calculate an input status delay time and the sum may be used as input into PID controller 402. The resulting output from PID controller 402 may then be used to set a new NAND status delay time.

The set point may be equal to the configured NAND status delay added to a product of 1 multiplied by a configured delay between status commands. PID parameter coefficients, Kp, Ki, and Kd, may be multiplied by the output of a proportional controller 404, an integral controller 406, and a derivative controller 406 (referred to herein as internal PID controllers) and may modulate the influence of each of the internal PID controllers on storage device 104.

The output of proportional controller 404 may be proportional to an error of storage device 104, wherein the error may be the difference between a set point target delay and the feedback input time for reading a non-busy NAND status. The set point may be computed by adding one inter-poll delay time to the current NAND status delay time to account for a target status command count of two. The output of integral controller 406 may be an accumulation of the error values from startup. The output of derivative controller 408 may be the rate of change of the error value. Proportional controller 404 may provide for a fast system response, integral controller 406 may correct the steady state error, and derivative controller 408 may dampen the system and reduce overshoot. The adjustment to be applied to a current target delay may be a summation of the output of proportional controller 404, integral controller 406, and derivative controller 408. The internal PID controllers may be tuned through a continuous trial and error process as there is no exact way to calculate the value for the parameters unless the complete system is mathematically modeled and simulated. The new feedback value may be equal to a status poll command count decreased by one and multiplied by a configured delay between NAND status polls, wherein the product may be added to the configured NAND delay time. As indicated above FIG. 4 is provided as an example. Other examples may differ from what is described in FIG. 4.

Figure 5:
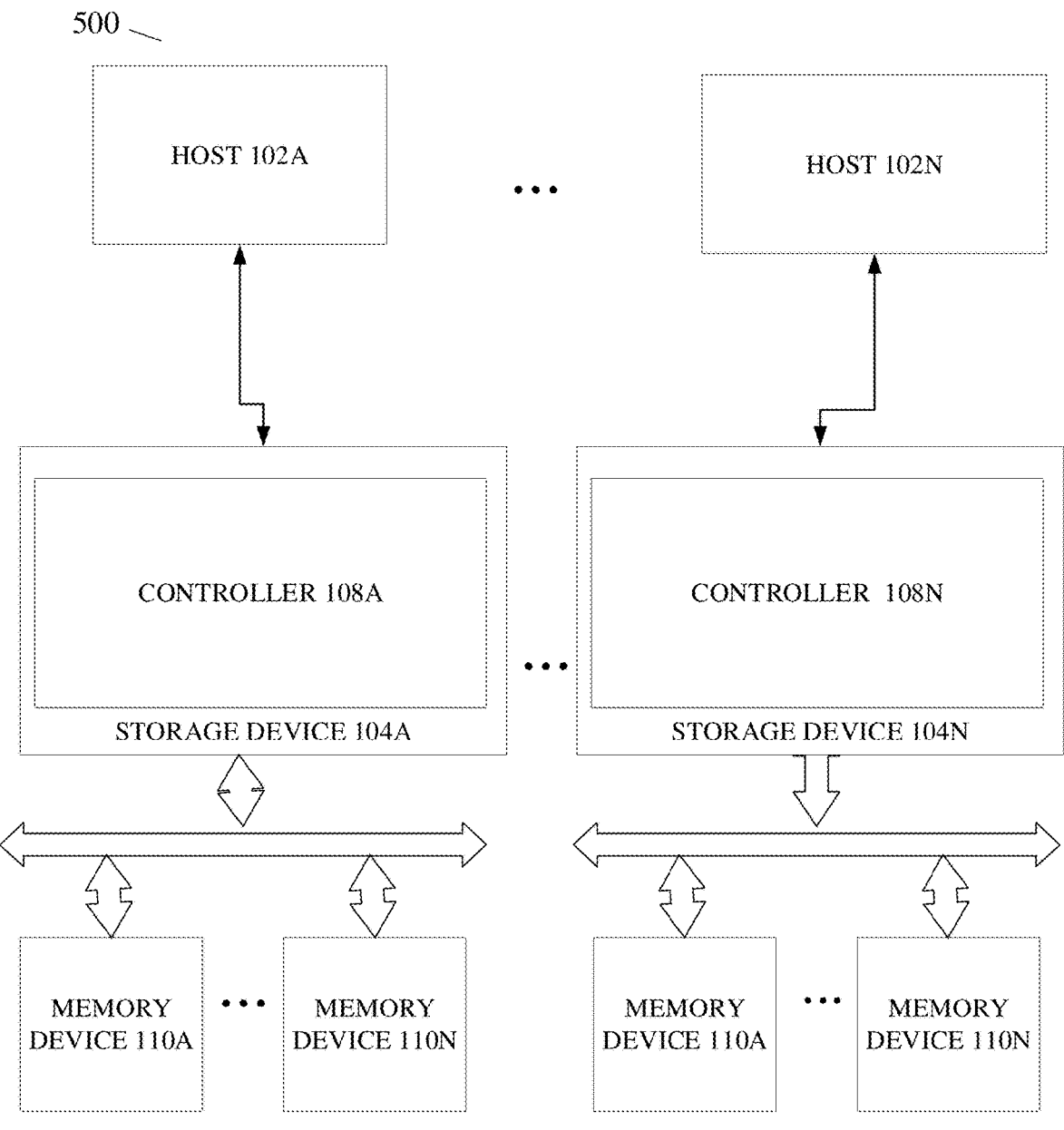
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102a-102n (referred to herein as host(s) 102), and one or more storage devices 104a-104n (referred to herein as storage device(s) 104). Storage device 104 may include a controller 108 to regulate the delay time associated with status polling. Hosts 102 and storage devices 104 may communicate via Non-Volatile Memory Express (NVMe) over peripheral component interconnect express (PCI Express or PCIe), SD, or the like.

Devices of Environment 500 may interconnect via wired connections, wireless connections, or a combination of wired and wireless connections. For example, the network in FIG. 5 may include NVMe over Fabric (NVMe-oF) Internet Small Computer Systems Interface (iSCSI), Fibre Channel (FC), Fibre Channel Over Ethernet (FCOE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

Figure 6:
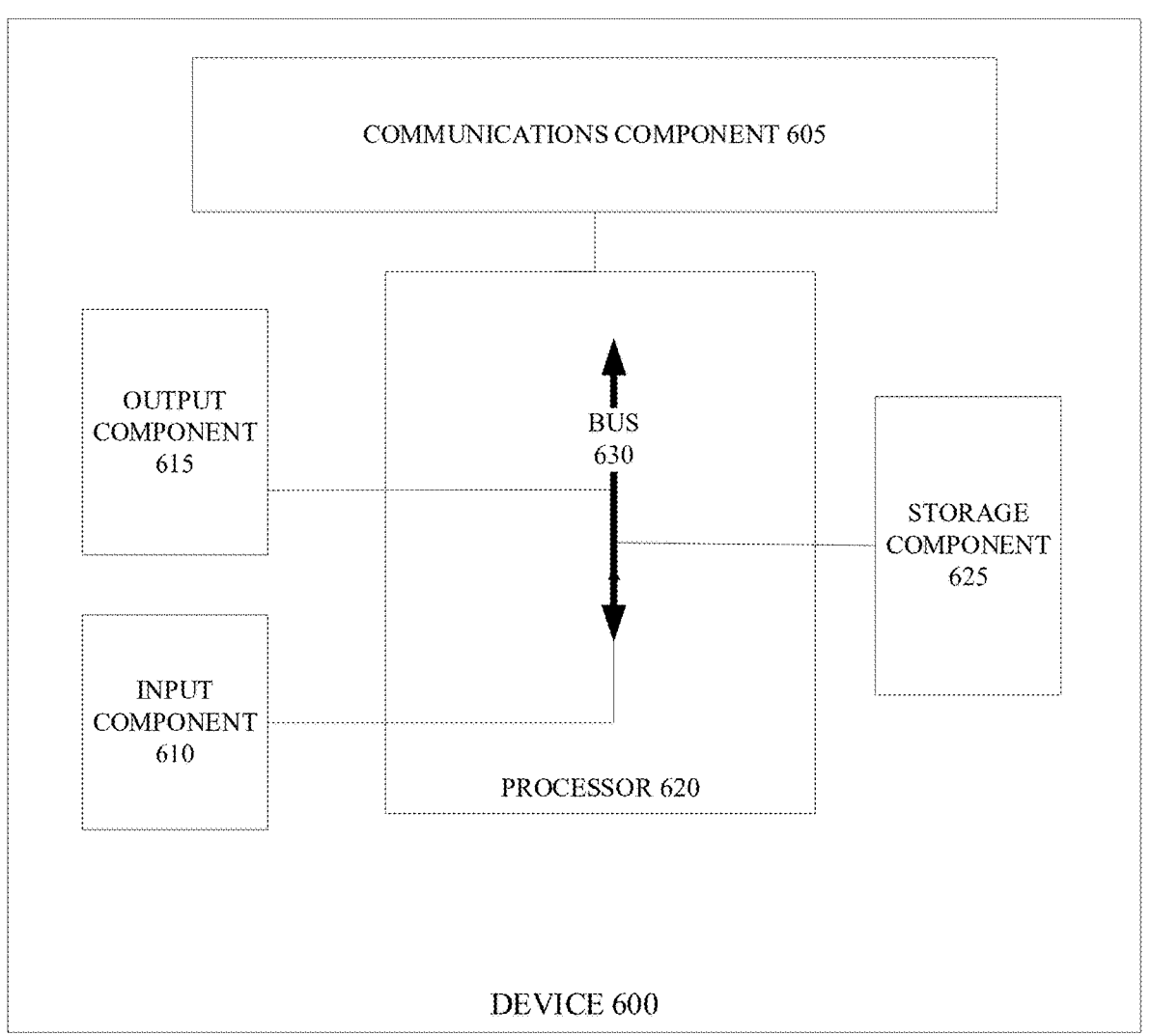
FIG. 6 is a diagram of example components of one or more devices of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, and a network/data connection port, or the like), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and network/data connection port, or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory (RAM 106), read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more" The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to dynamically adjust a delay time associated with status polling of a memory device, the storage device comprises:
   the memory device to store data and to operate on the data based on commands received from the storage device; and
   a controller to send a command to the memory device for the memory device to operate on the data based on the command, send a poll to the memory device to determine when the memory device has completed processing the command; and adjust the delay time between an upcoming command and another poll based on an adjustment mechanism associated with a status poll count,
   wherein the adjustment mechanism uses a proportional-integral-derivative controller that uses the status poll count to calculate an input status delay time, wherein a sum of input status delay times is inputted to the proportional-integral-derivative controller and an output from the proportional-integral-derivative controller is used to set a new delay time.

2. The storage device of claim 1, wherein the status poll count is a number of polls issued prior to receiving a non-busy status from the memory device and the adjustment mechanism includes recording the status poll count for the command in a buffer.

3. The storage device of claim 2, wherein a scaling factor is applied to the status poll count stored in the buffer.

4. The storage device of claim 2, wherein the adjustment mechanism further comprises computing a running average value for status poll counts in buffer, comparing the running average value with a target window, and adjusting the delay time based on a comparison.

5. The storage device of claim 4, wherein when the running average value is below the target window, the controller increases the delay time and if the running average value is above the target window, the controller decreases the delay time.

6. The storage device of claim 4, wherein the target window identifies a preset range for the running average value in the buffer.

7. The storage device of claim 1, wherein when the delay time is adjusted, the controller enters a cooldown period and does not adjust the delay time during the cooldown period.

8. The storage device of claim 1, wherein the status poll count for a command type is stored in a buffer associated with at least one of that command type, die, and page.

9. A method for dynamically adjusting a delay time associated with status polling of a memory device by a storage device, the storage device includes a controller to perform the method comprising:
   sending a command to the memory device for the memory device to operate on data based on the command;
   sending a poll to the memory device to determine when the memory device has completed processing the command;
   adjusting the delay time between an upcoming command and another poll based on an adjustment mechanism associated with a status poll count; and
   using a proportional-integral-derivative controller that uses the status poll count to calculate an input status delay time, wherein a sum of input status delay times is inputted to the proportional-integral-derivative controller and an output from the proportional-integral-derivative controller is used to set a new delay time.

10. The method of claim 9, further comprising recording the status poll count for the command in a buffer.

11. The method of claim 10, further comprising applying a scaling factor to the status poll count stored in the buffer.

12. The method of claim 10, further comprising computing a running average value for status poll counts in buffer, comparing the running average value with a target window, and adjusting the delay time based on a comparison.

13. The method of claim 12, further comprising increasing the delay time when the running average value is below the target window and decreasing the delay time when the running average value is above the target window.

14. The method of claim 9, further comprising entering a cooldown period when the delay time is adjusted, wherein the delay time is not adjusted during the cooldown period.

15. The method of claim 9, further comprising storing the status poll count for a command type in a buffer associated with at least one of that command type, die and page.

16. A storage device to dynamically adjust a delay time associated with status polling of a memory device, the storage device comprises:
   the memory device to store data and to operate on the data based on commands received from the storage device; and a controller to send a command to the memory device for the memory device to operate on the data based on the command, send a poll to the memory device to determine when the memory device has completed processing the command; record a status poll count for the command in a buffer, compute a running average value for status poll counts in the buffer, compare the running average value with a target window, and adjust the delay time between sending another command and another poll based on based on a comparison, wherein an adjustment mechanism uses a proportional-integral-derivative controller that uses the status poll count to calculate an input status delay time, wherein a sum of input status delay times is inputted to the proportional-integral-derivative controller and an output from the proportional-integral-derivative controller is used to set a new delay time.

17. The storage device of claim 16, wherein when the running average value is below the target window, the controller increases the delay time and if the running average value is above the target window, the controller decreases the delay time.

18. The storage device of claim 16, wherein when the delay time is adjusted, the controller enters a cooldown period and does not adjust the delay time during the cooldown period.

\* \* \* \* \*